United States Patent [19]

Aftergut

[11] 3,781,080

[45] Dec. 25, 1973

[54] LIQUID CRYSTAL DEVICE FOR GENERATING RETICLES IN OPTICAL EQUIPMENT

[75] Inventor: Siegfried Aftergut, Schenectady, N.Y.

[73] Assignee: General Electric Company, Schenectady, N.Y.

[22] Filed: Nov. 30, 1972

[21] Appl. No.: 310,861

[52] U.S. Cl. ............. 350/10, 324/115, 350/160 LC
[51] Int. Cl. ............................................. G02f 1/16
[58] Field of Search .................... 350/10, 160 LC; 324/115

[56] References Cited

UNITED STATES PATENTS 591,153   10/1897   Berger ................................. 350/10
3,581,002   5/1971   Dodds ....................... 350/160 LC X Primary Examiner—Edward S. Bauer
Attorney—Jerome C. Squillaro et al.

[57] ABSTRACT

Liquid crystal devices for generating reticles in optical instruments are described. The reticles include liquid crystal display devices having electrically selectable calibration scales corresponding to different magnification powers of the optical instrument.

7 Claims, 4 Drawing Figures

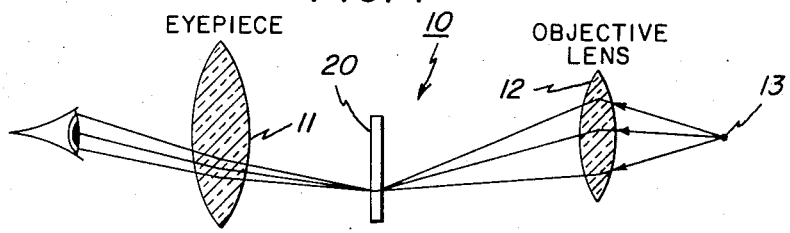
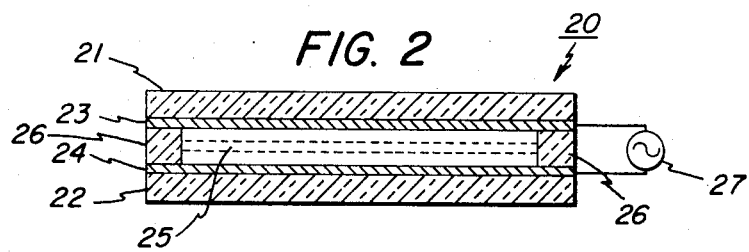
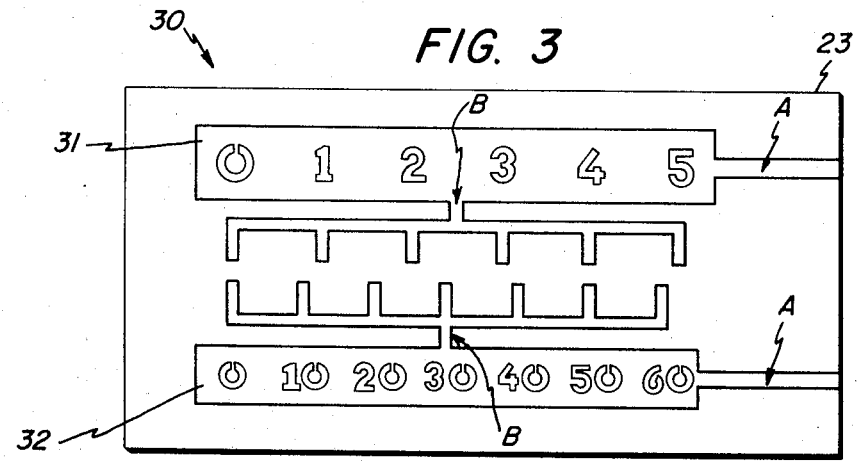
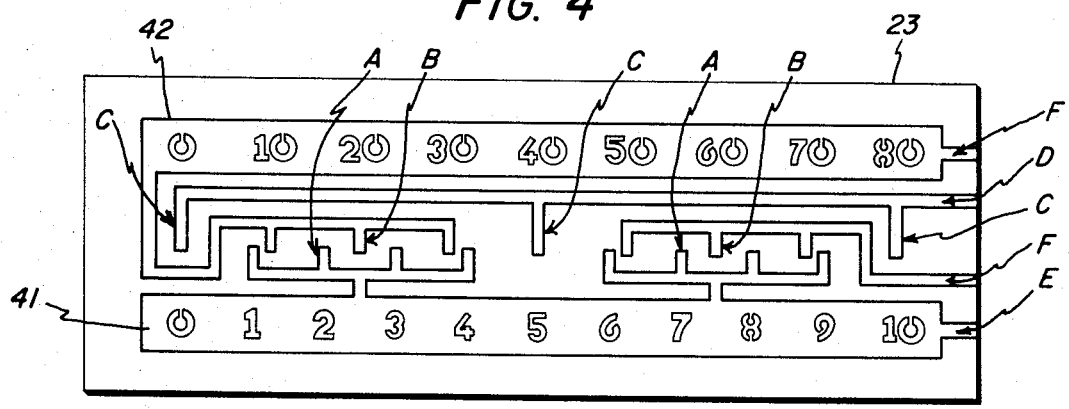

LIQUID CRYSTAL DEVICE FOR GENERATING RETICLES IN OPTICAL EQUIPMENT

The present invention relates to optical devices and more particularly to such devices with compound lens systems requiring reticles or cross hairs for determining image sizes or locating images within the optical devices.

Many optical instruments, such as microscopes, telescopes, range finders, etc., contain a reticle with a scale for determining the size of images formed by the optics. Generally, the scale calibration is accurate only for a given magnification and changes in the magnification require mathematical computations to determine the appropriate scale at the new magnification power.

In many applications, it is desirable to provide reticles with different scales depending upon the selected magnifying power. In the past, this has been achieved by replacing one reticle with another of appropriate calibration. However, this substitution is not only time consuming, but frequently results in misalignment of the instrument. Hence, present optical devices generally employ a reticle with a single scale and hence require the operator to determine the appropriate calibration of the scale depending upon the magnification power of the optical device.

It is therefore an object of this invention to provide a reticle or an optical device having a selectable scale depending upon the magnification of the optical device.

It is still a further object of this invention to provide a reticle with at least two different scales corresponding to different magnification powers of an optical device with the scales being selectable without the need for replacing reticles.

Still another object of this invention is to provide an optical instrument with selectable scales or patterns located in the focal plane of the optical instrument without the need for replacing the reticle.

Briefly, these and other objects of my invention are achieved by providing optical instruments with a reticle comprising a liquid crystal display device having selectable calibration scales corresponding to different magnification powers of the optical instrument. The liquid crystal display device advantageously includes multiple scales or patterns formed therein which are electrically activated by selection of the desired magnification power of the optical instrument.

These and other objects and advantages of my invention will become more apparent from the following detailed description taken in connection with the accompanying drawings in which:

FIG. 1 is a cross-sectional view of a typical compound optical instrument with a liquid crystal display cell located along the optical path of the instrument;

FIG. 2 is a cross-sectional view of a liquid crystal display cell;

FIG. 3 is a plan view of a liquid crystal display cell illustrating two different calibration scales; and FIG. 4 is a plan view of a liquid crystal display cell illustrating interdigitated graduation marks of two different scales with a common graduation mark for both scales.

FIG. 1 illustrates a typical compound optical instrument 10, such as a microscope for example, including an eye piece 11 and an objective lens 12 for viewing an image 13. A reticle 20 comprising a liquid crystal display device is located at the focal point of the objective lens 12. The function of the reticle 20 is to provide selectable calibration scales corresponding to the different magnification powers of the optical instrument.

FIG. 2 is a cross-sectional view of a typical reticle comprising a liquid crystal display cell including two glass substrates 21 and 22 in closely spaced parallel relationship with substantially transparent conductive coatings 23 and 24 on the opposing surfaces of the glass substrates 21 and 22, respectively. Typically, the glass substrates are spaced apart from each other by approximately five to 150 microns with thin conductive coatings of tin oxide, indium oxide or other suitably conductive and substantially transparent coatings.

The space between the glass substrates is filled with a liquid crystal material such as those described by Williams in U.S. Pat. No. 3,322,485 and Goldmacher et al in U.S. Pat. No. 3,499,702. Both of these patents are exemplary of the numerous liquid crystal materials useful in the practice of my invention. The liquid crystal material is contained within the glass substrates by suitable gaskets 26.

The use of liquid crystal display cells for generating reticles in optical devices is more clearly illustrated in FIG. 3 wherein a typical reticle 30 comprising two calibration scales 31 and 32 are shown in the conductive coating 23. By way of example, the calibration scales 31 and 32 are formed by etching the pattern shown in the conductive coating 23. The black lines in the pattern correspond to the absence of conductive material removed by etching. The calibration scales 31 and 32 each include a segment A which connects the pattern to the cell edge for making contact to a power supply, not shown. The calibration scales also include a segment B which interconnects the scale graduations with the corresponding numerical values. The conductive coating on the opposing substrate is etched in such a manner so as to remove conductive coating material from areas corresponding to segments A and B so that the liquid crystal material does not become activated in these areas when a voltage is applied to the conductive coatings.

In operation of the embodiment illustrated in FIG. 3, a calibration scale is made optically visible by applying a voltage from a voltage source 27 (shown in FIG. 2) to segment A of one of the two calibration scales and the conductive coating on the opposing glass substrate. In the case where the liquid crystal material 25 comprises a nematic liquid crystal composition, for example, the application of a voltage to the conductive coatings produces turbulence in the liquid crystal composition which causes dynamic scattering of light. The turbulence and resulting dynamic scattering of light occurs only in those regions subjected to an electric field; that is, in those regions underlying the graduation scale and the numerical calibration values. The light which is scattered in these regions is that light originating from the illumination source directed to the image to be viewed through the optical instrument.

In accord with my invention, upon changing magnification powers of the optical instrument, a different calibration scale is made optically visible by the application of a voltage to the desired calibration scale. For example, as illustrated in FIG. 2, the calibration scale 31 differs from the calibraation scale 32 by a factor of 12. Hence, where the difference in magnification power is also by a factor of 12 or any multiple of 10, i.e., 120, 1200, etc., the calibration scale 32 may be utilized. Those skilled in the art can readily appreciate that the calibration scales of any particular optical instrument may be selected in accord with the variations in magnification power and hence, with a single reticle, calibration scales for each magnification power may be provided and actuated with the change in magnification power.

Another example of a selectable reticle device is illustrated in FIG. 4. In this embodiment of my invention, two different scales 41 and 42 having interdigitated graduation marks A and B, respectively, with common graduation marks for both scales indicated by the letter C. Conductors D, E and F interconnect the various graduation marks and extend to the cell edges for making electrical contact thereto. As in the embodiment illustrated in FIG. 3, the black lines represent regions of the conductive coating removed by etching. Also, the conductive coating on the opposing substrate is etched in such a manner to remove the conductor portions from areas corresponding to the connecting leads illustrated in FIG. 4.

Operationally, scale 41 is displayed by applying a voltage from an external circuit to conductors D, E and the electrode on the other substrate. Scale 42 is displayed by applying a voltage to conductors D, F and the electrode on the opposing substrate.

The embodiments of my invention illustrated in FIGS. 2 and 3 employ liquid crystal cells utilizing the transmission of light through the cell to produce an optical image. Those skilled in the art can appreciate, however, that liquid crystal cells with selectable reticles utilizing reflected light for readout may also be constructed in accord with my invention. Such a device includes a conductive coating comprising a reflective material, rather than a transmissive material, such as aluminum, chromium, etc. The other electrode is transparent as in the display cells used for transmissive readout. Liquid crystal display cells employing reflected light for readout are useful in instruments such as weighing scales, speedometers, ohmmeters, etc., where the display scales are graduated in pounds or kilograms, miles per hour or kilometers per hour, volts and amperes, and the like.

Another area in which my invention may be utilized to great advantage is in telescopes and optical gun sights used for moving targets, such as airplanes, tanks, etc. In these applications, present optical instruments generally employ a reticle including a sight lead which requires the use of a motor driven screw to displace the reticle or a tilting mirror operated by a gyro or servo motor to take into account the different conditions of distance and speed of the moving target. In accord with my invention, the sight lead may be changed without any moving parts. The lead may be changed merely by electrically activating a different sight lead. Hence, my invention provides a substantial improvement in such devices.

In summary, I have described a novel means for providing optical instruments with a reticle having selectable calibration scales corresponding to different magnification powers of the optical instrument. Those skilled in the art can readily appreciate that numerous modifications and variations of my invention will be readily recognized by those skilled in the art. For example, a fail-safe feature may be included in the event of loss of power. Such a feature may easily be provided by a few permanent opaque marks on the reticle. It is therefore to be understood that changes may be made in the particular embodiments of my invention described which fall within the full intended scope of my invention as defined by the appended claims.

What I claim as new and desire to secure by Letters Patent of the United States is:

1. In combination with an optical instrument having selectable magnification, the improvement comprising:
    a liquid crystal display device having a reticle including at least two different scales corresponding to different magnification powers of said optical instrument and being located substantially at the focal point of the objective lens of said optical instrument; and
    means for electrically activating one of said scales corresponding to the selected magnification power of said optical instrument.

2. The combination of claim 1 wherein said liquid crystal display device comprises:
    a pair of substantially parallel glass plates having conductive electrodes on opposing surfaces of said plates, at least one of said conductive electrodes being substantially transparent; and
    a liquid crystal material interposed between said glass plates.

3. The combination of claim 2 wherein said conductive electrodes have patterns formed therein corresponding to the two scales.

4. The combination of claim 3 wherein said electrically activating means includes:
    a voltage source; and
    means for electrically connecting one of said patterned conductive electrodes to said voltage source.

5. The combination of claim 2 wherein the conductive electrodes on both glass plates are substantially transparent.

6. The combination of claim 1 wherein said two scales are arranged with interdigitated graduation marks.

7. The combination of claim 6 wherein said two scales have at least one graduation mark common to each scale.

* * * * *